United States Patent [19]

Hashimoto et al.

[11] Patent Number: 5,503,481

[45] Date of Patent: Apr. 2, 1996

[54] BEARING SURFACES WITH ISOTROPIC FINISH

[75] Inventors: Fukuo F. H. Hashimoto, North Canton; Rao-Sheng Zhou, Canal Fulton; Kevin Howlett, North Canton, all of Ohio

[73] Assignee: The Timken Company, Canton, Ohio

[21] Appl. No.: 164,477

[22] Filed: Dec. 9, 1993

[51] Int. Cl.$^6$ .............................. F16C 33/58; F16C 33/36
[52] U.S. Cl. ........................ 384/569; 384/565; 384/571
[58] Field of Search ................................. 384/571, 490, 384/492, 565, 569, 625

[56] References Cited

U.S. PATENT DOCUMENTS

| | | | |
|---|---|---|---|
| 4,491,500 | 1/1985 | Michaud et al. | 156/628 |
| 4,705,594 | 10/1987 | Zobbi et al. | 156/637 |
| 4,789,438 | 12/1988 | Polan | 204/13 |
| 4,818,333 | 4/1989 | Michaud | 156/628 |
| 4,877,340 | 10/1989 | Hoeprich | 384/571 |
| 4,893,387 | 1/1990 | Akamatsu et al. | 29/121.1 |
| 5,158,629 | 10/1993 | Zobbi | 156/628 |

FOREIGN PATENT DOCUMENTS

| | | | |
|---|---|---|---|
| 2640009 | 6/1990 | France . | |
| 60-294084 | 10/1985 | Japan . | |
| 168021 | 6/1990 | Japan | 384/565 |
| 117725 | 5/1991 | Japan | 384/569 |
| 266410 | 9/1992 | Japan | 384/565 |
| 321816 | 11/1992 | Japan | 384/565 |

OTHER PUBLICATIONS

Akamatsu, Yoshinobu, Improvement of Rolling Bearing Fatigue Life by Reforming the Surface Roughness Pattern *Japanese Journal of Tribology*, vol. 37, No. 1, 1992, pp. 819–826.

REM Chemicals, Inc., Chemically Accelerated Vibratory Mass Finishing Processes no date.
REM Chemicals, Inc., FERROMIL II Products from REM no date.
Patir, Nadir and Cheng, H. S., An Average Flow Model for Determining Effects of Three–Dimensional Roughness on Partial Hydrodynamic Lubrication, *Transactions of the ASME*, vol. 100, Jan. 1978, pp. 12–17.

*Primary Examiner*—Thomas R. Hannon
*Attorney, Agent, or Firm*—Polster, Lieder, Woodruff & Lucchesi

[57] ABSTRACT

A roller bearing has working surfaces, that is surfaces where its rollers and races contact each other, which have extremely shallow irregularities that are nondirectional and thus render the working surfaces isotropic. Moreover, the isotropic surfaces have very low average asperity slopes and likewise a very low plasticity indexes. To derive the high quality working surfaces, the races and rollers are first ground or otherwise mechanically machined to provide the working surfaces with the proper profiles. Then the races and rollers are immersed in a liquid chemical which reacts with the metal at the surfaces and contemporaneously forms a protective coating which inhibits further reaction. Abrading elements within the chemical come against the races and rollers as they are agitated and continuously remove the coating from higher elevations of the working surfaces, so that the chemical continues to react with the metal at those higher elevations. The irregularities diminish to very shallow pits of no particular orientation, thus leaving the working surfaces isotropic. Thereafter, in the absence of the chemical, the protective coating is removed, exposing the high quality working surface. The bearing requires no run in, that is to say, after the initial loading its torque and temperature remain steady at low magnitudes. Moreover, the isotropic surface imparts greater fatigue life.

16 Claims, 4 Drawing Sheets

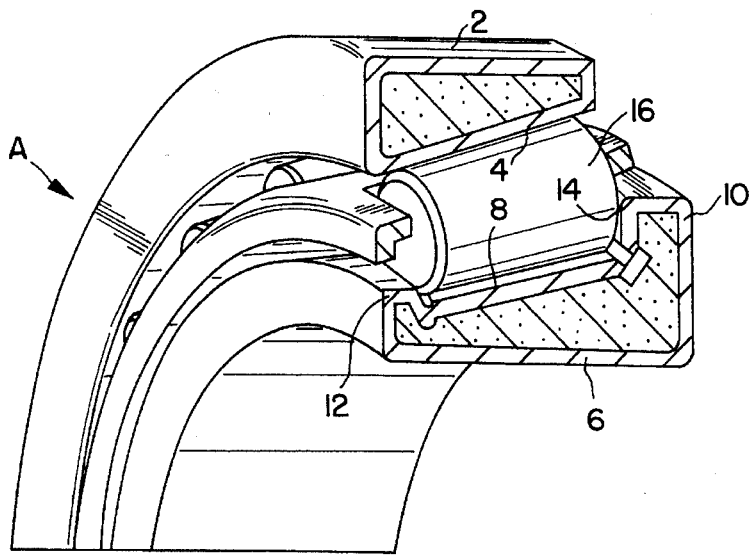
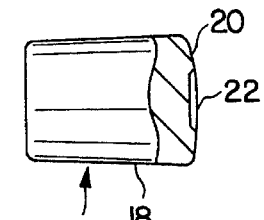
FIG.1A
FIG.1B
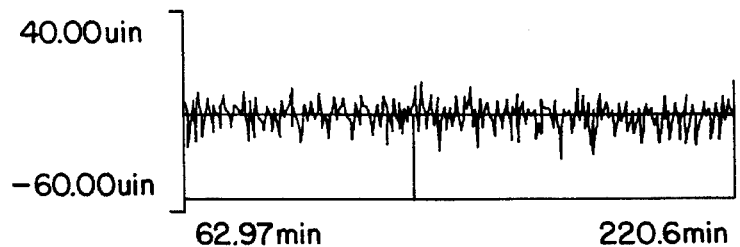
Ra=4.23uin.
Rp=22uin
Delq=6.2 deg.
Ψ=1.54
FIG.2A
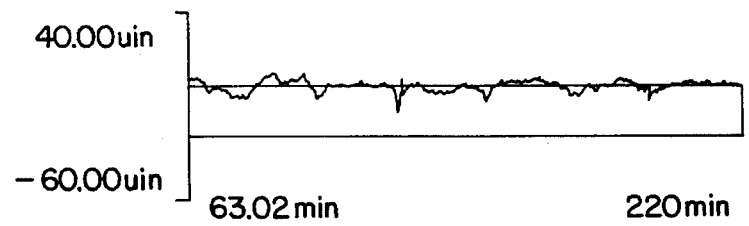
Ra=2.44uin.
Rp=9.5uin
Delq=1.8deg.
Ψ=0.44
FIG.2B
FIG.2C
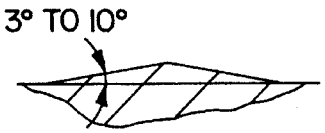
FIG.2D
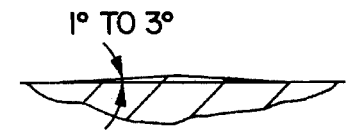
FIG.2E

BEARING SURFACES WITH ISOTROPIC FINISH

BACKGROUND OF THE INVENTION

This invention relates in general to antifriction bearings and, more particularly, to such bearings having superior finishes on their critical working surfaces and a process for providing such bearings.

From the standpoint of antifriction bearings, the tapered roller bearing has a rather complex geometry. A single row tapered roller bearing, which is the most fundamental of that type of bearing, has two races, called the cup and the cone, each provided with a tapered raceway, and tapered rollers arranged in a single row between the raceways of the cup and the cone. Generally speaking, line contact exists between the tapered side faces of the rollers and the raceways. In addition, one of the races, usually the cone, has a thrust rib against which the large ends of the rollers bear. Indeed, were it not for the thrust rib, the rollers would be expelled from the annular space between the raceways, since radial loads transmitted through the rollers translate into small axial components which urge the rollers up the tapers of the raceways—and against the thrust rib.

Initial impressions would suggest that the two raceways and the side faces of the rollers should lie in conical envelopes having their apexes at a common point along the axis of rotation, for this would produce pure rolling contact between the side faces of the rollers and the raceways. In actual practice, the roller side faces and the raceways have slightly curved profiles to alleviate edge loading and accommodate eccentricity imparted by the load. Considerable research has focused on deriving the ideal configurations for raceways and roller side faces, and algorithms exist for determining those configurations. See U.S. Pat. No. 4,877,340.

Apart from that, one would, upon initial consideration, conclude that the large end faces of the rollers should be squared off with respect to the axes of the rollers. Actually the end faces have a slightly spherical profile, for this enables the rollers, upon bearing against the thrust rib, to acquire the proper orientation along the raceways.

The typical bearing is finished to within close tolerances with a final grind on its critical working surfaces. But in some bearings, the finishing along the working surface is carried farther to reduce the run-in period for the bearing and to enable it to operate at lower torques and with less heat generation. These bearings have enhanced finishes. A bearing with an enhanced finish receives rough grind on its critical surfaces, then a finish grind, and finally honing or superfinishing. An enhanced finish possesses some roughness—as do all surfaces—but the roughness is of a microscopic character. Generally, it ranges between 3 and 8 uin Ra (Ra stands for arithmetic mean roughness—uin for microinch or one-millionth of an inch), which is superior to a minimum of 6 to 10 uin Ra, and more often 15 to 25 uin Ra, one finds on the working surfaces of bearings which are finished with nothing more than a final grind. Grinding and honing, however, produce directional surface textures, with the surface irregularities, minute as they may be, extending in the circumferential direction. Indeed, current machining practices leave the circumferential orientation as the only orientation available. But the circumferential orientation does the least to facilitate lubrication along the line of contact between the raceways and the side faces of the rollers.

In this regard, N. Patir and H. S. Cheng, in their paper entitled *An Average Flow Model for Determining Effects of Three-Dimensional Roughness .oOn Partial Hydrodynamic Lubrication,* Transactions of the ASME, Vol. 100, page 12, January 1978, examined orientations of microscopic surface irregularities in connection with their effects on lubrication and concluded that a surface composed of irregularities extended longitudinally in the direction of movement renders the lubricant less effective than a surface having irregularities extended transversely to the direction of movement, and that an isotropic surface, that is one which has no orientation to its irregularities, is superior to a surface composed of longitudinal orientations. Translated to bearings, the typical machining process leaves the raceways and roller side faces with machining marks in the form of circumferentially directed grooves which tend to diminish the thickness of the hydrodynamic oil film which exists between the raceways and rollers, and this holds true even with respect to bearings having enhanced finishes.

So-called barrel finishing, that is to say, tumbling a part within a corrosive environment, will leave a surface with minute irregularities that are quite shallow, but the traditional barrel finishing procedures destroy the precision profiles to which the roller side faces and raceways are machined. Thus, traditional barrel finishing does not represent an acceptable substitute for producing a bearing with an improved finish.

The present invention resides in a process for providing superior working surfaces for bearing components. Usually the races and rollers on which those working surfaces exist are machined, ultimately by grinding, such that those surfaces have the desired profiles. Then some or all of these components are subjected to a further finishing which leaves the surface with irregularities on the order of 1 to 3 uin Ra. The irregularities have no orientation and thus render the surface isotropic. The invention also resides in an antifriction bearing having working surfaces with isotropic finishes.

DESCRIPTION OF THE DRAWINGS

In the accompanying drawings which form part of the specification and wherein like numerals and letters refer to like parts wherever they occur:

FIG. 1A is a perspective view, partially cut away and in section, of a tapered roller bearing finished with isotropic working surfaces in accordance with the present invention, and 1B further showing an individual roller separate and in elevation;

FIGS. 2A–2E depicts tracings derived from two surfaces, one having a traditional enhanced finish and the other an isotropic finish of the present invention, and further provides characteristics of such surfaces;

DETAILED DESCRIPTION

Figure 3A:
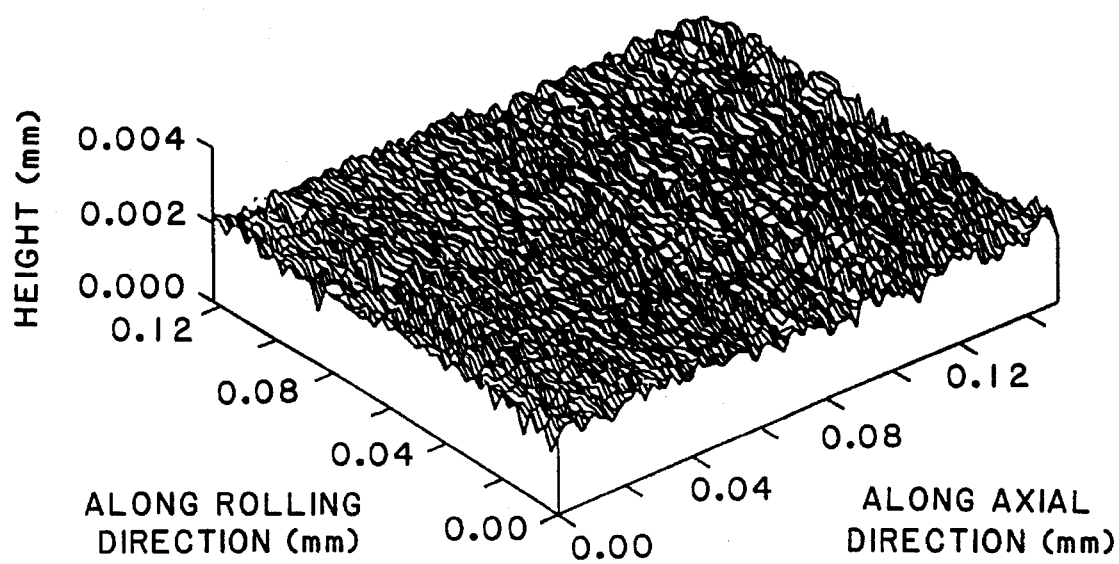
FIGS. 3A–3B shows in perspective a surface with traditional enhanced finish and a surface with an isotropic finish.

Referring to the drawings, a bearing A (FIG. 1) operates at low internal torque and generates relatively little heat from the very outset. Indeed, it requires no so-called "run-in" to condition its working surfaces, which are, of course, the surfaces against which the major components of the bearings contact each other. As such, the temperature and torque of the bearing A remain constant from the very outset of operation, save for the short time required for the bearing A to reach its normal operating temperature. To this end, at least one of the working surfaces of the bearing A has very shallow surface irregularities of a microscopic character, and these irregularities are without orientation, that is to say, the surface is isotropic. Preferably, all of the working surfaces have these characteristics. The surfaces derive from traditional grinding followed by a vibratory-chemical finishing operation that is basically set forth in U.S. Pat. No. 4,491,500.

The process is particularly useful for finishing the working surfaces of tapered roller bearings, and the bearing A is such a bearing in its most basic configuration, that is with its rolling elements organized in a single circular row around the axis X of rotation. The bearing A includes (FIG. 1) an outer race or cup 2 having a tapered raceway 4 which is presented inwardly toward the axis X of rotation. The raceway 4 represents the working surface of the cup 2. In addition, the bearing A has an inner race or cone 6 provided with a tapered raceway 8 which is presented outwardly away from the axis X of rotation, and inasmuch as the cone 6 lies within the cup 2, the cone raceway 8 is presented toward the cup raceway 4. The cone raceway 8 lies between large and small ribs 10 and 12 which project outwardly beyond the raceway 8. The large rib 10, also known as a thrust rib, has a rib face 14 located at the large end of the tapered raceway 8. The raceway 8 and rib face 14 constitute the working surfaces of the cone 6. Finally, the bearing A has tapered rollers 16 arranged in a single circumferential row between the cup 2 and cone 6, that is to say, in the annular space formed by the spaced apart, yet opposed, raceways 4 and 8. Each roller 16 has a tapered side face 18 which contacts the two raceways 4 and 8, there being, generally speaking, line contact between the roller side faces 18 and the raceways 4 and 8. Each roller 8 also has an end face 20 which extends out to the large end of the side face 18 and a recess 22 opening out of the end face 20, thus giving the end face 18 an annular configuration. The end face 20 has a slightly spherical profile, that is to say, it lies within an envelope having the shape of a sphere. The distance between the two ribs 10 and 12 slightly exceeds the length of rollers 16, and indeed it must to enable the rollers 16 to properly seat along the raceways 4 and 8 and against the rib face 14. The side faces 18 and end faces 20 form the working surfaces of the rollers 16. While the traditional tapered roller bearing has its thrust rib 10 at the large end of the cone raceway 8, some tapered roller bearings have their thrust ribs at the large ends of their cup raceways.

When the rollers 16 are properly seated between the raceways 4 and 8 of the cup 2 and cone 6, respectively, the end faces 20 of the rollers 16 bear against the rib face 14 on the large or thrust rib 10 of the cone 6. Indeed, a radial load transmitted through the bearing A will urge the rollers 16 toward the large rib 10, as will an axial load. When the rollers 16 are so seated, generally speaking, line contact exists between the side faces 18 of the rollers 16 and the raceways 4 and 8. Moreover, in this context, the conical envelopes formed by the two raceways 4 and 8 have their apexes at a common point along the axis X of rotation, or in other words, the rollers 16 are on apex.

But the raceways 4 and 8 are not truly conical, and the same holds true for the roller side faces 18. Instead, they are slightly curved in profile, usually crowned. This produces a more uniform stress distribution along the raceways 4 and 8 and roller side faces 18. Further modification to the profiles for the raceways 4 and 8 and side faces 18 may exist to accommodate misalignment produced by extremely heavy loads, and to otherwise distribute loads more uniformly along the raceways 4 and 8. U.S. Pat. No. 4,877,340 describes a process for deriving the profiles for raceways and roller side faces, with the objective of obtaining uniform life along the lines of contact between the roller side faces and the raceways.

Figure 3B:
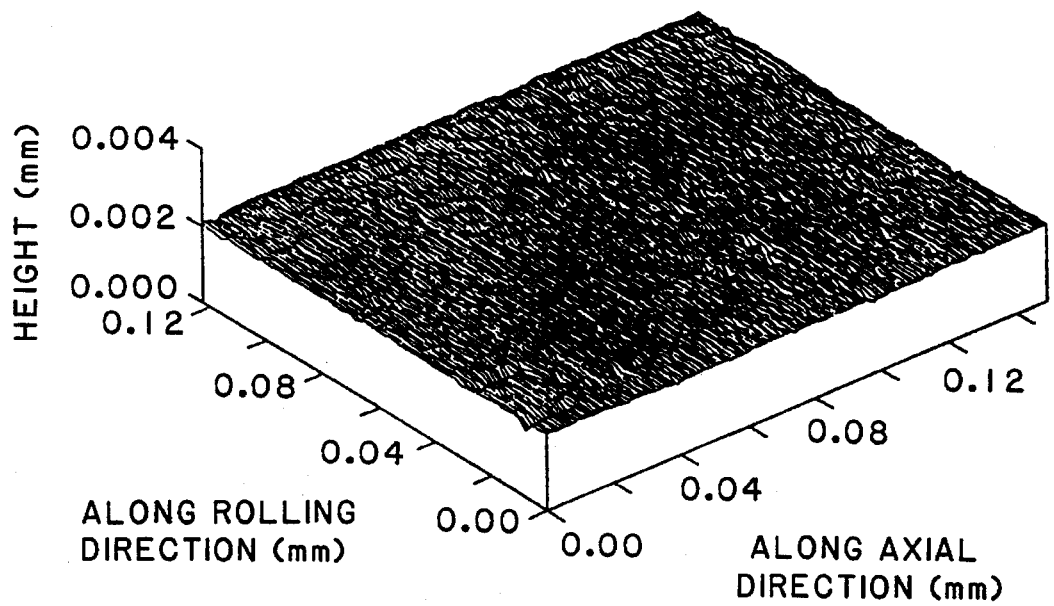
Figure 4A:
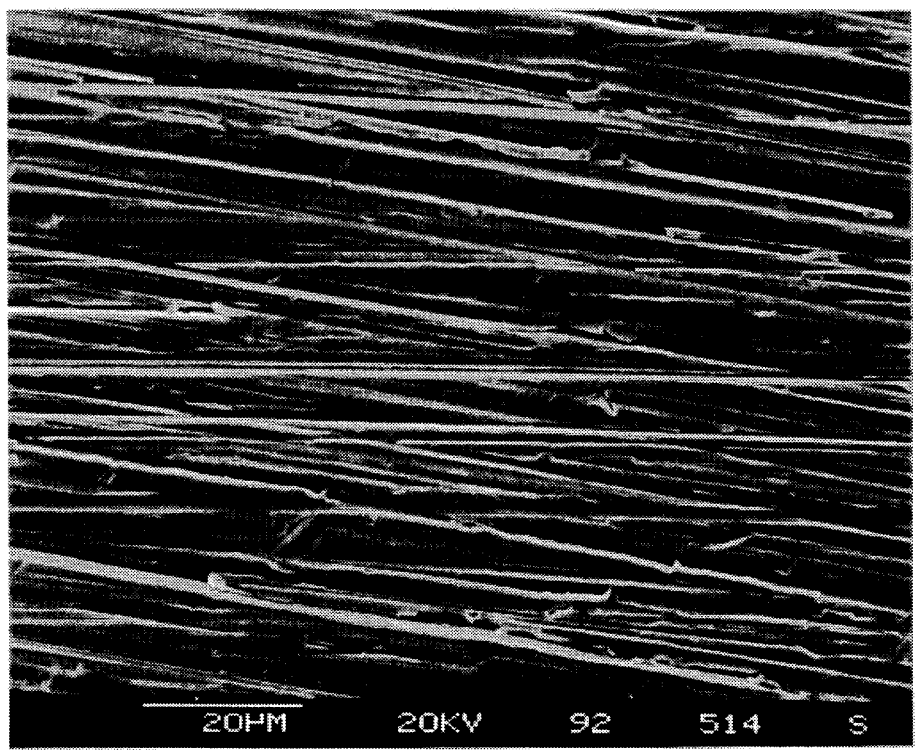
FIGS. 4A–4B are highly magnified photographic representations of a surface with traditional enhanced finish and a surface with an isotropic finish of the present invention.
Figure 4B:
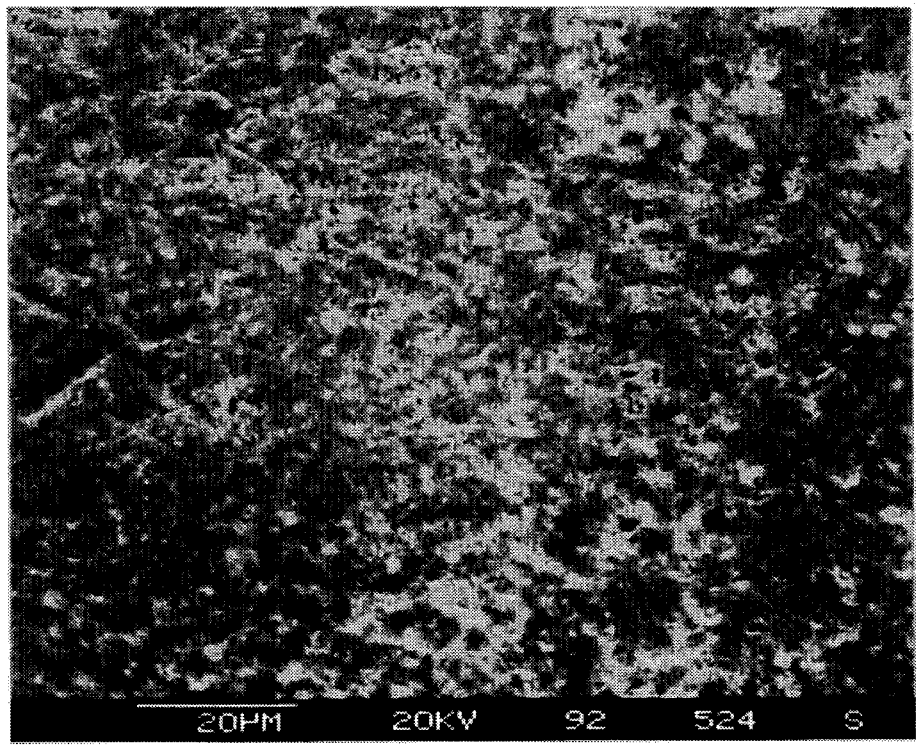

Irrespective of how one determines the profiles for the raceways 4 and 8 and the side face 18 of the rollers 16, either the raceways 4 and 8 or the side faces 18, or more likely both, will not lie within true conical envelopes, but instead will be slightly crowned. These crowned profiles are derived from traditional machining operations, such as by grinding or hard turning, and these machining operations leave the raceways 4 and 8, the cone rib face 14, and the roller side and end faces 18 and 20 with machining marks or surface irregularities that extend circumferentially and thus are directional. At the conclusion of the last grind on a bearing so finished, the directional surfaces have a roughness of about 10 to 30 uin Ra. A bearing with enhanced finishes, however, receives further finishing to refine its working surfaces, particularly the raceway 4 of the cup 2, the raceway 8 and rib face 14 of the cone 6, and the side faces 18 and end faces 20 of the rollers 16. Using traditional bearing manufacturing practices, these further finishing operations include another grind and conclude with honing or superfinishing. Neither of these procedures affects the profile imparted by the previous grind—and indeed they are controlled so that they do not degrade the profile. The result is an enhanced finish having surface irregularities on the order of 1 to 5 uin Ra (FIGS. 3 & 4).

Actually, arithmetic mean roughness (Ra) is only one of several characteristics used to define a working surface, such as either of the raceways 4 and 8 of the bearing A. The following formula defines Ra:

$$Ra = \frac{1}{L} \int_0^L [Z(x)] dx$$

where

L is the assessment length

Z is the height of the surface profile above and below the centerline x is the location of each measurement Then there is the maximum height (Rp) of the profile above its mean line which is also significant.

Perhaps the most significant of all the characteristics is the root-mean-square average slope (Delq) for the irregularities in the profile, this of course being an angular quantity (FIG. 2). It is calculated using the following formula:

$$Delq = \left[ \frac{1}{L} \int_0^L [\theta(x) - \bar{\theta}]^2 dx \right]^{\frac{1}{2}}$$

where

Θ is the slope of the profile at any given point $$\bar{\theta} = 1/L \int_0^L \Theta(x)dx$$

Also significant is the surface plasticity index ($\psi$) which is used to describe the elastic-plastic deformation properties of a surface. The contact surfaces of a bearing that has rolling elements change during the run-in period for the bearing and ultimately arrive at a stable condition. The amount of surface change, which is reflected in the operating torque and temperature, and the duration of the run-in period are presented in the plasticity index—the higher the index the greater the change in torque and temperature during the run-in period and likewise the longer the run-in period. The following formula defines the plasticity index:

$$\psi = \frac{E'}{H} \tan Delq$$

where

E' is the composite Young's modulus $$E' = \left[ \frac{1-\upsilon_1^2}{E_1} + \frac{1-\upsilon_2^2}{E_2} \right]^{-1}$$

H is the hardness of material.

$\upsilon_1$ and $\upsilon_2$ are the Poisson's ratios.

$E_1$ and $E_2$ are the moduli of elasticity.

A typical working surface on a bearing which is released after a final grind has the following characteristics:

| | |
|---|---|
| Ra | 12 uin |
| Rp | 55 uin |
| Delq | 9.0° |
| $\psi$ | 2.24 |

The grind leaves the surface with directional irregularities or machine marks which extend circumferentially.

A typical working surface having an enhanced finish displays the following characteristics (FIG. 2A):

| | |
|---|---|
| Ra | 4.23 uin. |
| Rp | 22. uin. |
| Delq | 6.2° |
| $\psi$ | 1.54 |

Its irregularities are likewise circumferential.

On the other hand, a typical working surface finished in accordance with the process of the present invention has the following characteristics (FIG. 2B):

| | |
|---|---|
| Ra | 2.44 uin. |
| Rp | 9.5 uin. |
| Delq | 1.8° |
| $\psi$ | 0.44 |

The plasticity index may be as high as 0.74. Moreover, the surface is isotropic (FIGS. 3 & 4).

The process of the present invention relies on conventional machining to bring the working surface of the bearing A to the proper profile with an arithmatic mean roughness (Ra) of typically 10 to 20 uin and usually no more than about 30 uin. Thus, the cup raceway 4, the cone raceway 8 and rib face 14, and the roller side faces 18 and end faces 20 initially have ground finishes with the machining marks or irregularities extending in the circumferential direction. Then the cup 2, cone 6 and rollers 16 are subjected to a chemically assisted vibratory finishing process which to a large measure obliterates the machining marks and renders what remains of them simply nothing more than very shallow pits of no particular orientation. As such, the process, which is sometimes called mechano-chemical vibratory finishing, renders the working surfaces isotropic (FIGS. 3 & 4).

Basically, the finishing process takes place in a tub which contains a liquid chemical that flows continuously through the tub at a suitable rate, perhaps 1 to 5 gal/hr. A mechanism coupled to the tub vibrates it, and of course the vibrations are transmitted to the liquid chemical within the tub. The chemical, the pH of which is on the order of 1.5, has the capacity to react with the steel such that it attacks the surface of steel. The reaction produces a film or coating which thereafter protects the steel from further attack by the chemical. The film, however, is not firmly bonded to the steel, and indeed is easily displaced, although not by the vibrating chemical. The cup 2, cone 6 and rollers 16 are placed into the liquid chemical within the tub along with appropriate abrading elements, such as small triangular or angle cut cylindrical blocks. Preferably, the abrading elements are formed from a hard substance, such as a ceramic, which is not attacked by the chemical. The abrading elements, owing to the vibration in the chemical, come against the exterior surfaces on the cup 2, cone 6, and rollers 16 and wear away the protective coating, thus exposing the steel to further attack by the chemical. But the abrading elements only remove the protective coating at higher elevations along the surfaces, so that the surfaces remain protected at their lower elevations. As a consequence, the elevated regions of the surfaces are scoured away, while the depressed regions remain intact. The surface areas of the elevated regions increase to the point that the depressed regions are almost obliterated. The agitation within the chemical continues until the directional machine marks fade into very shallow pockets of essentially no orientation. In other words, the cup 2, cone 6 and rollers 16 remain in the chemical until the working surfaces represented by the raceways 4 and 8, the rib faces 14 and the roller faces 18 and 20 become isotropic surfaces. Up to this point the scouring occurs uniformly on the surfaces, so the profiles left by the original machining remain substantially unchanged.

To be sure, the cup 2, cone 6 and rollers 16 should not remain in the vibrating chemical too long, lest the profiles of the raceways 4 and 8 and roller side faces 18 will be degraded. Generally speaking, the processing in the chemical should cease as soon as the machine marks become isotropic.

Once the working surfaces on the cup 2, cone 6, and rollers 16 become isotropic, the delivery of chemical to the tub is terminated and replaced by a burnishing liquid which flows at a much greater rate, perhaps 20 to 40 gal/hr The burnishing liquid, which has a pH on the order of 8.5, neutralizes what remains of the liquid chemical and otherwise removes the protective coating remaining on the cup 2, cone 6 and rollers 16, bringing their surfaces, including the raceways 4 and 8, the rib face 14 and the roller faces 18 and 20, which represent the working surfaces, down to the metal. Each working surface exhibits a mirror-like appearance.

REM Chemicals, Incorporated, of Southington, Conn., sells the liquid chemical and the burnishing liquid for performing the process which REM Chemicals designates as the FERROMIL process. It has acquired several U.S. patents on the process and on compositions and devices used in the process. U.S. Pat. No. 4,491,500 describes the basic process; U.S. Pat. No. 4,705,594 likewise describes process, but focuses on liquid chemicals. U.S. Pat. No. 4,818,333 is devoted primarily to the so-called media or abrading elements used in the process. On the other hand, U.S. Pat. No. 5,158,620 relates primarily to the burnishing liquid.

A bearing provided with isotropic working surfaces in accordance with the present invention has a very low surface plasticity index—indeed, one so low that the bearing requires no-run-in to bring it to its optimum operating condition. When compared to an equivalent bearing having enhanced finishes on its working surface, the bearing with the isotropic surfaces displays superior operating characteristics.

Figure 5:
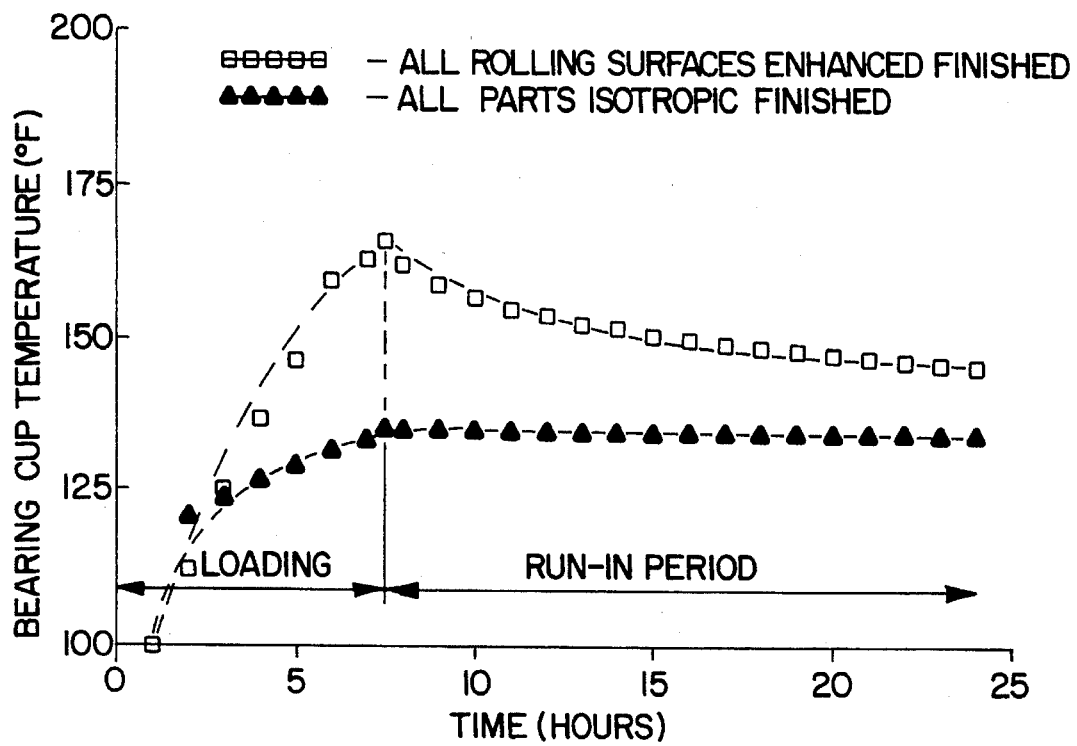
FIG. 5 is a graph comparing the operating temperatures of two bearings, one having a traditional enhanced finish and the other an isotropic finish, during the initial hours of operation.
Figure 6:
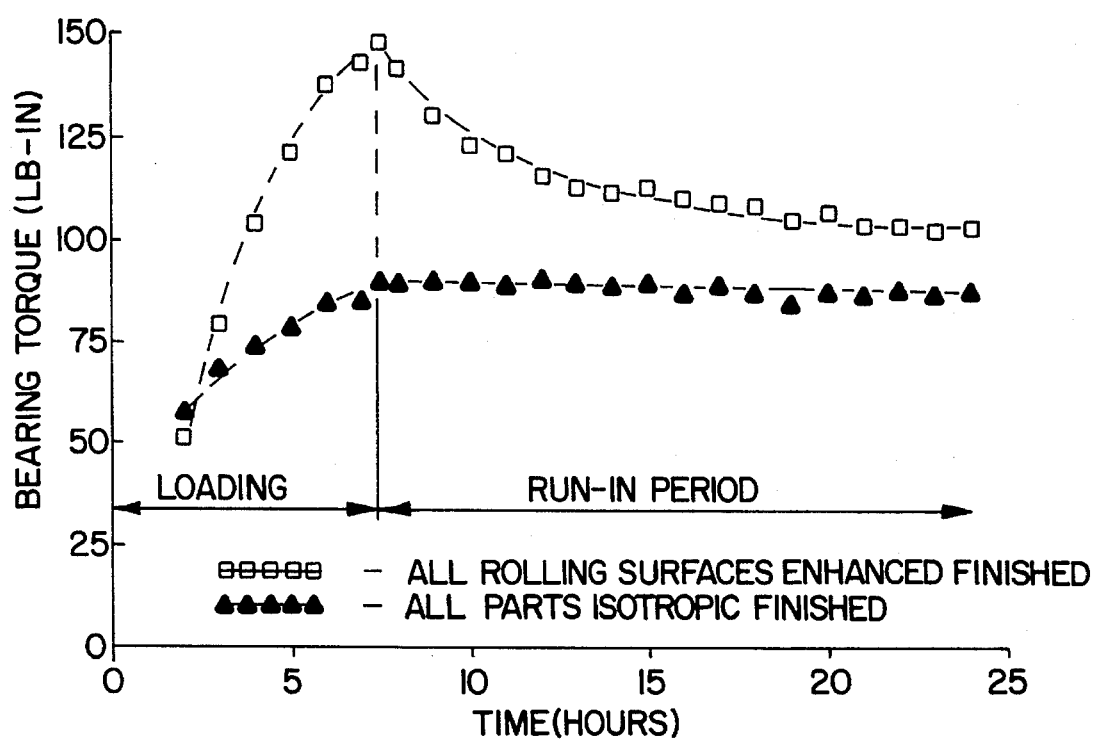
FIG. 6 is a graph comparing the operating torque of two bearings, one having a traditional enhanced finish and the other an isotropic finish, during the initial hours of operation.

In this regard, two single row tapered roller bearings, which were identical in every respect, except for the finish of their operating surfaces, and which had further never seen use, were set in operation under identical conditions, including with the same radial load and with the same lubrication. The one bearing had working surfaces finished in accordance with the present invention, that is, its raceways 4 and 8, its rib face 14, and its roller side and end faces 18 and 20 were all isotropic and otherwise corresponded to the characteristics of a typical isotropic working surface previously described. The other bearing had the very same working surfaces provided with an enhanced finish meeting the characteristics previously described for such a surface. After operating each bearing for about one hour with no load, the radial load was gradually applied to each bearing until at the end of about 7 hours, each bearing was fully loaded at 27500 lbs. By this time the bearing with the isotropic finish had reached its normal operating temperature and it continued to operate at that temperature (FIG. 5). The bearing with the enhanced finish reached a substantially higher temperature at the same time, but over the next 12 hours that temperature dropped, which is typical of a bearing undergoing run-in (FIG. 5). At about 20 hours the bearing cooled to its normal operating temperature which was higher than the operating temperature for the bearing with the isotropic surfaces. The torques required to sustain the operation of the bearings exhibited similar characteristics. For the bearing with the isotropic working surfaces, it rose as the load was applied and then remained constant (FIG. 6). For the bearing with enhanced finish on its working surfaces, the torque rose substantially on initial loading to a maximum at the onset of the full load, and then decreased, becoming constant at about 20 hours (FIG. 6). But the torque at which the bearing with the enhanced finish leveled off was higher than the torque at which the bearing with the isotropic finish leveled off. Moreover, the bearing having the isotropic surfaces exhibited greater fatigue life than the bearing with enhanced surfaces. It likewise exhibits greater fatigue life than bearings finished with final grinds, and of course lower temperature and torque as well.

While the process is described in connection with a tapered roller bearing, it is also useful in finishing the working surfaces on other types of bearings such as cylindrical roller bearings, spherical roller bearings and ball bearings.

Cylindrical roller bearings have raceways and rib faces which serve as working surfaces and of course rollers which move along those working surfaces and in their own right have working surfaces. Preferably, all of the working surfaces have an isotropic finish. In a ball bearing, the working surfaces include the raceways and the spherical surfaces of the rolling elements and preferably all have isotropic finishes.

This invention is intended to cover all changes and modifications of the example of the invention herein chosen for purposes of the disclosure which do not constitute departures from the spirit and scope of the invention.

What is claimed is:

1. A rolling element bearing comprising:
   an outer race having at least one working surface;
   an inner race having at least one working surface;
   rolling elements interposed between said inner and outer races and contacting the races at the working surfaces on the races;
   said rolling elements and at least one of said working surfaces having an isotropic surface finish.

2. The bearing of claim 1 wherein said working surface of said inner race comprises a first raceway.

3. The bearing of claim 2 wherein said isotropic finish is provided on said first raceway.

4. The bearing of claim 1 wherein said working surface of said outer race comprises a second raceway.

5. The bearing of claim 1 wherein said isotropic finish is provided on said second raceway.

6. The bearing of claim 1 wherein one of the races is provided with a rib having a working surface, the working surface on the rib is provided with an isotropic finish.

7. The bearing of claim 6 wherein said working surface further comprises said first raceway of said inner race.

8. The bearing of claim 7 wherein said working surface further comprises said second raceway of said outer race.

9. A bearing according to claim 1 wherein the profiles for said one working surface and the rolling elements are derived by mechanical machining which leaves the working surface and the rolling elements with irregularities that impart an arithmetic mean roughness (Ra) of not more than about 30 uin.; and wherein said one working surface and the rolling elements are reduced to an arithmetic mean roughness (Ra) of no more than about 3 uin. and rendered isotropic by immersing the race with that working surface and the rolling elements in a liquid chemical that reacts with the metal of the race and rolling elements and produces a protective coating which covers the working surface and rolling elements and substantially inhibits further reaction until removed, and continuously removing the coating at higher elevations along the working surface and rolling elements so that they are scoured away at those higher elevations until they are isotropic.

10. A bearing according to claim 1 wherein the rolling elements and said one working surface have surface irregularities of substantially no greater than 3 uin.

11. A bearing according to claim 1 wherein the profiles for said one working surface and the rolling elements are derived by mechanical machining; and wherein said one working surface and the rolling elements are rendered isotropic by immersing the race with that working surface and the rolling elements in a liquid chemical that reacts with the metal of the race and rolling elements and produces a protective coating which covers the working surface and rolling elements and substantially inhibits further reaction until removed, and continuously removing the coating at higher elevations along the working surface and rolling elements so that they are scoured away at those higher elevations until they are isotropic.

12. A tapered roller bearing comprising: a metal first race provided with a raceway; a metal second race provided with a raceway that is presented toward the raceway of the first race; a rib having a rib face at the end of the raceway on one of the races; rollers of metal arranged in a circular row between the raceways of the first and second races and having side faces which contact the raceways and end faces which bear against the rib face; the raceways, rib face, and roller side and end faces containing irregularities that are nondirectional so that the surfaces represented by the raceways, rib face, and roller side and end faces are isotropic.

13. A bearing according to claim 12 wherein the profiles for the raceways and the roller side faces and end faces are derived by mechanical machining.

14. A bearing according to claim 12 which further does not exhibit an increased temperature or torque coupled with a subsequent decrease in those characteristics during the initial operation of the bearing.

15. A bearing according to claim 12 wherein the profiles for the raceways and the roller side faces and end faces are derived by mechanical machining; and wherein the machined raceways and roller side and end faces are rendered isotropic by immersing the races and rollers in a liquid chemical that reacts with the metal of the races and rollers along the raceways and roller side and end faces and produces a protective coating which covers the raceways and roller side and end and substantially inhibits further reaction until removed, and continuously removing the coating at higher elevations along the raceways and roller side and end faces so that the raceways and roller side and end faces are scoured away at those higher elevations until they are isotropic.

16. A tapered roller bearing comprising: a metal first race provided with a raceway; a metal second race provided with a raceway that is presented toward the raceway of the first race; a rib having a rib face at the end of the raceway on one of the races; rollers of metal arranged in a circular row between the raceways of the first and second races and having side faces which contact the raceways and end faces which bear against the rib face; the raceways, rib face, and roller side and end faces containing irregularities that are nondirectional so that the surfaces represented by the raceways, rib face, and roller side and end faces are isotropic, the profiles for the raceways and the roller side faces and end faces having been derived by mechanical machining which leaves the raceways and roller end and side faces with irregularities that impart an arithmetic mean roughness (Ra) of not more than about 30 uin., the machined raceways and roller side and end faces having been reduced to an arithmetic mean roughness (Ra) of no more than about 3 uin. and rendered isotropic all by immersing the races and rollers in a liquid chemical that reacts with the metal of the races and rollers along the raceways and roller side and end faces and produces a protective coating which covers the raceways and roller side and end faces and substantially inhibits further reaction until removed, and continuously removing the coating at higher elevations along the raceways and roller side and end faces so that the raceways and roller side and end faces are scoured away at those higher elevations until they are isotropic.

\* \* \* \* \*

UNITED STATES PATENT AND TRADEMARK OFFICE
CERTIFICATE OF CORRECTION

PATENT NO. : 5,503,481
DATED : Apr. 2, 1996
INVENTOR(S) : F. Hashimoto, R. Zhou, K. Howlett It is certified that error appears in the above-indentified patent and that said Letters Patent is hereby corrected as shown below:

On title page, item [56]

OTHER PUBLICATIONS
line 3, vol. 37, No. 1, should read:
    vol. 37, No. 7

Col. 2, line 3, delete ".o" between "Roughness" and "On".

Claim 5
Col. 8, line 20, delete "1" and insert ---4---.

Signed and Sealed this

Fourth Day of February, 1997

Attest:

BRUCE LEHMAN

*Attesting Officer*    *Commissioner of Patents and Trademarks*